Inventors
Alfred S. Quick
Arthur A. Rivington
By their Attorney

Sept. 17, 1957 A. S. QUICK ET AL 2,806,232
SOLE MOLDING MACHINES
Filed Sept. 2, 1955 4 Sheets-Sheet 4

Inventors
Alfred S. Quick
Arthur A. Rivington
By their Attorney

United States Patent Office 2,806,232
Patented Sept. 17, 1957

2,806,232

SOLE MOLDING MACHINES

Alfred Stanley Quick and Arthur Alan Rivington, Leicester, England, assignors to United Shoe Machinery Corporation, Flemington, N. J., a corporation of New Jersey Application September 2, 1955, Serial No. 532,238

Claims priority, application Great Britain September 28, 1954

6 Claims. (Cl. 12—21)

This invention relates to machines for operating on unattached soles, and more particularly to machines for molding outsoles in preparation for their attachment to shoe bottoms.

Outsole molding is commonly effected by subjecting the sole to pressure between a pair of appropriately shaped molds. In order that the sole be properly molded it is essential that it be properly positioned with respect to the molds before pressure is applied to the sole. An object of the present invention is to provide improved gaging means for locating the soles relatively to the molds at the beginning of the molding operation.

To this end and in accordance with a feature of the invention, gaging means are provided which, with the molds in separated relation, are in open positions but which at the beginning of the movement of each mold toward the other are moved to engage opposite edges of the sole at spaced points properly to locate the sole widthwise of the molds, the gages moving vertically upward with the lower mold until the lower mold is in proximity to the upper mold whereupon upward movement of the gages ceases and the gages are finally moved downwardly and outwardly with respect to the lower mold and are latched in their open positions.

The above and other objects of the invention, including novel combinations of parts and details of construction, will now be described with reference to the drawings and pointed out in the claims.

Figure 1:
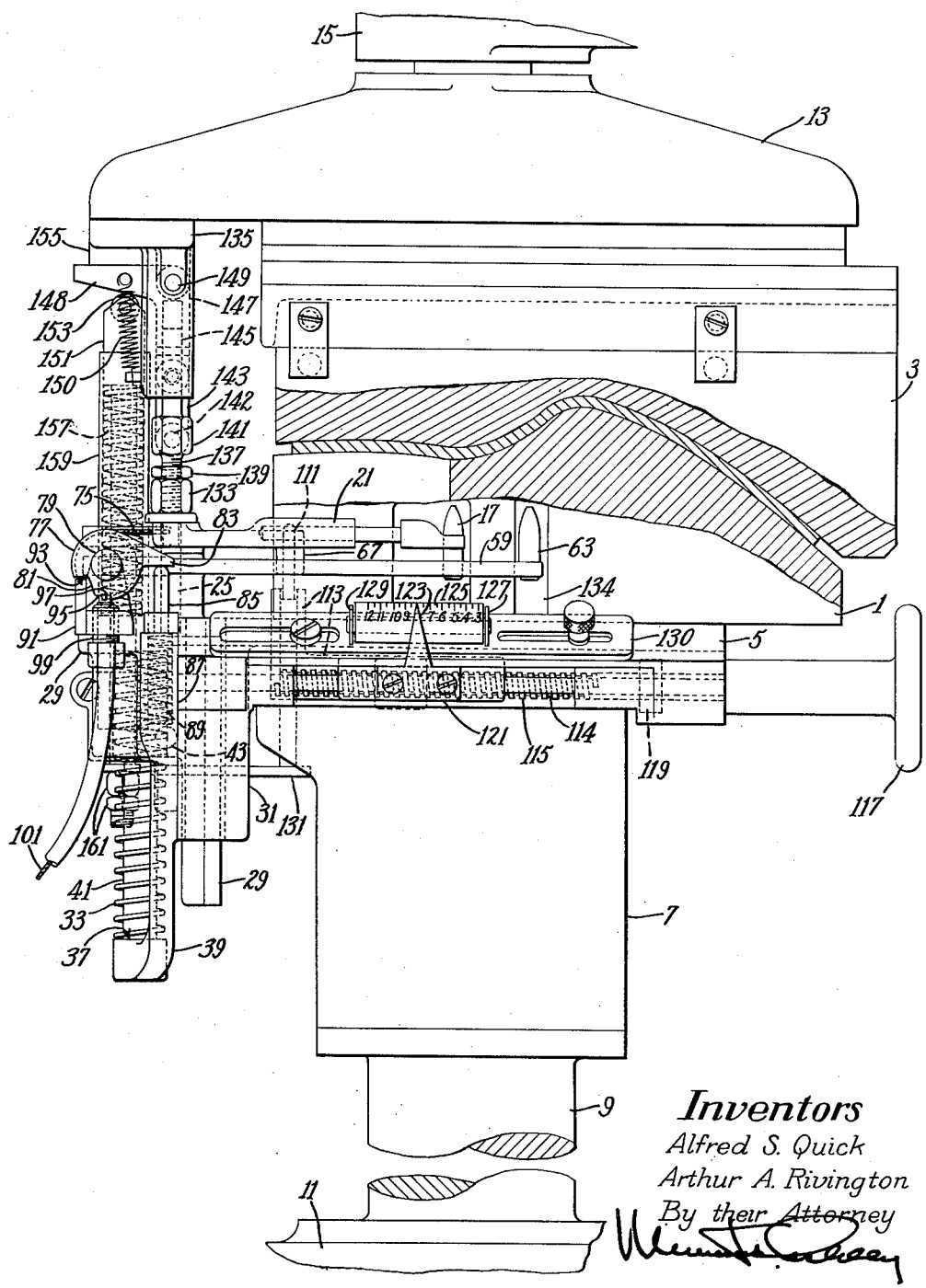
Fig. 1 is a front elevation, partly in section, of the operating instrumentalities of one station of a machine in which the invention is embodied.

The invention may be embodied in a two-station machine each station of which comprises a lower mold 1 of metal or other suitable non-yielding material upon which a sole to be molded is placed, and a cooperating upper mold 3 toward and away from which the lower mold is moved. The lower mold is carried by a holder 5 which is in the form of an inverted shallow box fixed to a block 7 carried by the upper end of a plunger 9 which is guided for vertical movement in the frame of the machine shown at 11 and reciprocated by a suitable power mechanism, such as the piston of a hydraulic motor.

The upper mold 3 is preferably formed of rubber or similar material and is carried for horizontal adjustment on a crosshead 13 which may be mounted for vertical adjustment in an overhanging portion 15 of the machine frame.

For locating the sole properly with respect to the lower mold 1, two pairs of gages are employed, one of which engages the opposite edges of the sole in the vicinity of the heel breast line and the other of which engages the opposite edges of the sole in the shank portion of the shoe rearwardly of the ball line.

Figure 3:
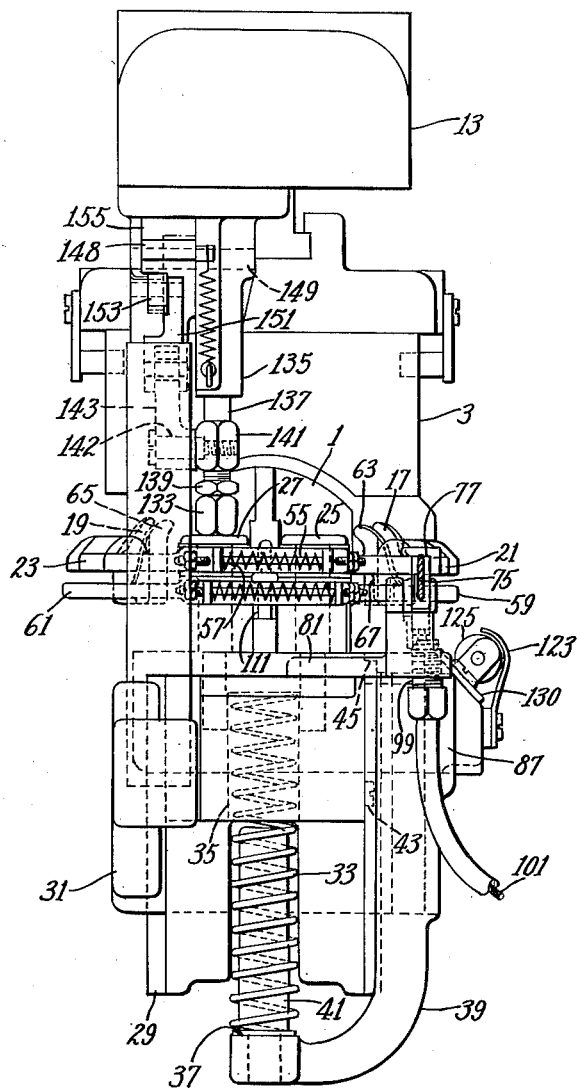
Fig. 3 is a left side elevation of the mechanism shown in Fig. 1.

The breast line gages comprise a pair of vertically disposed fingers 17 and 19 which for the major part of their lengths are vertical but at their upper ends curve slightly toward each other. The gages 17 and 19 are carried by rods 20 which are in turn adjustably carried by heelwardly extending supporting arms 21 and 23. The rods 20 are secured by locking screws 24 in the proper positions of adjustment. The arms 21 and 23 are carried for swinging movement toward and away from each other about a vertical axis on studs 25, 27 fixed on a vertically movable carriage 29 (Figs. 1 and 3) slidably mounted in vertical guideways formed in a downwardly extending portion 31 of the lower mold holder 5. The carriage 29 is urged upwardly by a spring 33, the upper end portion of which is received in a recess 35 in the under side of the carriage. The lower end of the spring abuts against a face 37 provided on a boss formed on a downwardly extending arm 39 carried by the portion 31 of the lower mold holder. An upwardly extending pin 41 carried by the boss of the arm 39 passes upwardly into the spring 33 to prevent buckling of the spring when compressed.

For limiting upward movement of the carriage, a stop 43 carried thereby is arranged for engagement with a face 45 on the lower mold holder. The arms 21, 23 which support the breast line gages 17, 19 are arranged for simultaneous movements toward and away from each other and for this purpose are provided adjacent the studs 25, 27 with intermeshing gear segments 47, 49. For limiting the extent of movement of the gages toward each other, the arms 21, 23 have rearwardly extending arms 51, 53 which are slotted to receive a rod 55 threaded at its ends to receive nuts and lock nuts. Engagement of the nuts with the outer sides of the arms 51, 53 limits the closing movement of the gages. The gages are normally urged toward their closed positions by a spring 57 which surrounds the rod between the arms 51, 53.

Pivoted on the studs 25, 27 below the arms 21, 23 are arms 59, 61 carrying at their outer ends gage fingers 63, 65, similar to the fingers 17, 19 but arranged to contact the edge of the sole in the shank portion. The arms 59, 61 are geared together and are normally moved inwardly toward each other by a spring in the same manner as the arms 21, 23. For causing opening movement of the gage fingers 63, 65 with the fingers 17, 19, the arm 21 has a downwardly projecting ear 67 arranged for engagement with the inner edge of the arm 59.

For moving the gages into open positions, the arm 21 has formed thereon a boss 71 in which is carried a trunnion pin 73 to which is fastened one end of a short length of flexible wire 75. A portion of the boss 71 is cut away to allow unimpeded passage of the wire. The wire passes around a portion of the periphery of a drum 77 and is attached thereto. The drum is mounted for free rotation on a horizontal stud 79 carried by a bracket 81 fixed on the carriage 29. Upon rotation of the drum 77 in a counterclockwise direction, as viewed in Fig. 1, the arm 21 swings outwardly of the mold 1 causing the arm 23 also to swing outwardly in the opposite direction. The ear 67 on the arm 21, by its engagement with the arm 59, will cause similar movements to be imparted to the arms 59 and 61.

Figure 2:
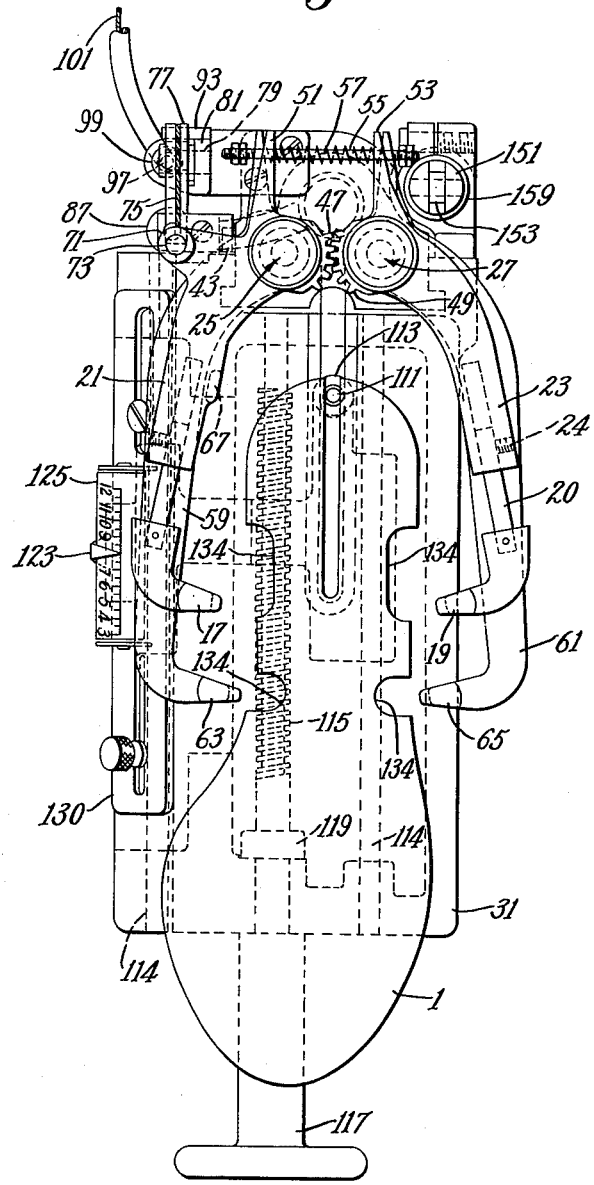
Fig. 2 is a plan view of the sole gages and mechanisms associated therewith.
Figure 4:
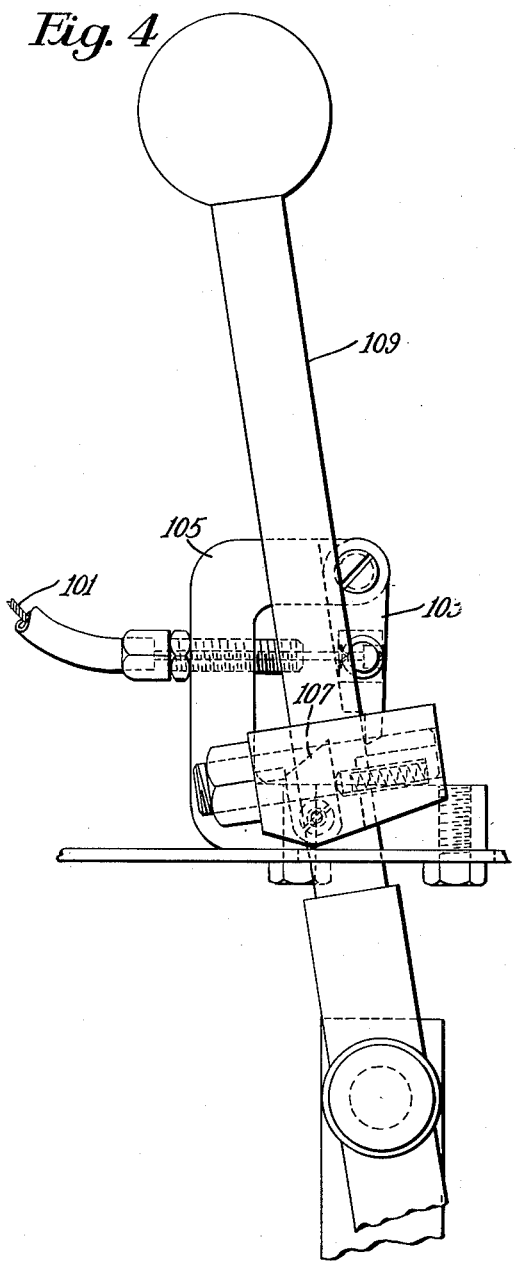
Fig. 4 is a front elevation of the trip handle by means of which the gages are permitted to be moved to locate the sole properly with respect to the molds.
Figure 5:
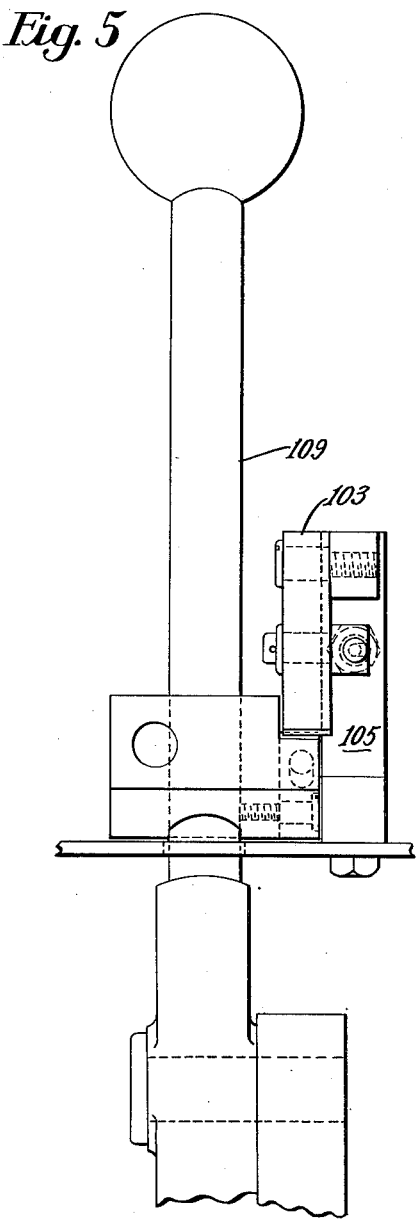
Fig. 5 is a right side elevation of the mechanism shown in Fig. 4.

For rotating the drum to open the gages, it is provided with an arm 83 (Fig. 1) arranged, upon movement of the mold 1 upwardly with respect to the carriage 29 as will be described, to be engaged by a yieldable abutment 85 mounted for vertical movement in a housing 87 fixed to the lower mold holder, whereupon the drum rotates in a counterclockwise direction to open the gages. The abutment 85 is normally held in its uppermost position in the housing 87 by a spring 89 which is strong enough to overcome the springs 57 (Figs. 2 and 3) which urge the gages toward their closed positions. Should the lower mold carrier rise to a position higher than that necessary to cause the gages to be opened the desired amount, as for example if a thin sole is being operated upon, a shoulder 93 on the drum 77 will engage a stop 91 fixed to the lower mold holder preventing further turning movement of the drum, whereupon the abutment 85 yields against the spring 89. A portion of the periphery of the drum 77 is cut away to form a notch 95 arranged for engagement by a spring plunger 97 when the drum has rotated sufficiently to cause the gages to open. This plunger maintains the gages in their open positions until the plunger is withdrawn on tripping the machine, whereupon the gages are closed by the springs 57. The plunger 97 is supported for vertical movement in a housing 99 secured below the drum to the bracket 81. The lower end of the plunger is connected to a Bowden wire 101 the other end of which is connected, as shown in Fig. 4, to an arm 103 depending from and pivoted on a bracket 105 fixed to the frame of the machine. The arm 103 is arranged to be moved about its pivot by engagement with a pawl 107 carried by an operator-actuated member 109 which is also arranged to trip the machine and initiate the molding operation. Upon movement of the arm 103 in a counterclockwise direction, as viewed in Fig. 4, by actuation of the member 109 in tripping the machine, the spring plunger 97 is withdrawn from the notch in the drum 77, whereupon the gages are permitted to move inwardly toward each other and engage the edge of the sole to be operated upon.

For locating the sole lengthwise of the molds a heel end gage 111 is provided in the form of an upstanding pin mounted for vertical movement in a hole formed in a carriage 113 arranged for movement lengthwise of the lower mold 1 along rods 114. For thus moving the gage pin 111 lengthwise of the lower mold a coarse threaded screw 115 (Fig. 2) is provided having on its outer end a hand wheel 117. The screw, which has an unthreaded portion at each end, is journaled in the holder 5, a collar 119 fixed to the screw cooperating with the hand wheel 117 to prevent endwise movement of the screw. The screw 115 is threaded into the carriage 113 so that upon rotation of the hand wheel 117 the carriage and the gage pin 111 are moved lengthwise of the mold. The carriage 113 is provided with a laterally extending arm 121 which extends through a slot in the wall of the mold holder 5 and carries at its outer end a pointer 123 which cooperates with a scale 125 which may be calibrated in accordance with various sizes of soles to be operated upon. The scale is formed on a cylinder which is axially supported by two small brackets 127, 129 secured to an adjustable plate 130 on the lower mold holder. The cylinder may be provided with several scales calibrated differently to correspond to different styles of shoe soles. Upon turning the cylinder about its axis appropriate scales may be brought into position adjacent to the pointer 123.

The gage pin 111 rests on a plate 131 carried by the vertically movable carriage 29 and, upon adjustment of the gage pin for different sizes of shoe soles, the pin slides along the supporting plate 131. Upon downward movement of the carriage 29 relatively to the lower mold 1, the plate 131 moves down with the carriage permitting downward movement of the gage pin 111.

The carriage 29 is arranged to have its upward movement arrested at a predetermined time in the upward movement of the lower mold, to eliminate the posssibility of interference between the gage fingers and the upper mold. For this purpose, the crosshead 13 carries an abutment 133 which is engaged by the head of one of the studs 25, 27 as the lower mold 1 approaches the upper mold 3. As the mold 1 continues its upward movement the gage fingers are received in clearance grooves 134 provided in the side walls of the mold 1 so that the gages may remain in contact with and retain control over the sole until the lower mold has almost reached molding position.

During the latter part of the upward movement of the lower mold, the carriage 29 is given a rapid downward movement causing lowering of the gages and also causing them to be quickly opened. For this purpose the abutment 133 has imparted to it a downward movement during the latter portion of the upward movement of the lower mold. The abutment 133 is in the form of a nut threaded on a vertically disposed thrust member 137 and locked in adjusted position by a second nut 139. The upper end of the thrust member 137 is cylindrical and is vertically slidable in a bearing in a bracket 135 carried by the crosshead 13. A block 141 forms the central portion of the thrust member and carries a laterally extending pivot 142 to which the lower end of a toggle link 143 is connected. The upper end of the link 143 is pivoted to a bifurcated lower end of an upper toggle link 145 which forms an arm of a bell crank lever 147. The bell crank lever is pivoted on a pin 149 supported by the bracket 135. The bell crank lever includes an arm 148 which extends substantially at right angles to the arm 145 and has attached thereto one end of a spring 150 the other end of which is secured to the bracket 135 so as normally to hold the toggle in a broken position with the abutment 133 elevated above the position shown in Fig. 1. For straightening the toggle a thrust rod 151 carrying at its upper end a roll 153 is arranged to be moved upwardly with the lower mold, whereupon the roll 153 engages the arm 148 moving the bell crank 147 to the position shown in Fig. 1, thereby straightening the toggle and moving the abutment 133 downwardly.

The toggle is prevented from going beyond straightened position by the engagement of the arm 148 of the bell crank lever 147 with a stop 155 carried by the crosshead 13. The thrust rod 151 is supported by a spring 157 within a sleeve 159 with which the thrust rod is mounted for sliding vertical movements. The lower end of the sleeve 159 is fixed to the holder for the lower mold 1. Lock nuts 161 are carried by the lower end of the thrust rod 151 to determine the height-wise position of the thrust rod with the lower mold in its lower position. As the lower mold rises the thrust rod moves with it and at a predetermined time in the upward movement of the lower mold the toggle comprising the links 145, 143 is straightened moving the abutment 133 downwardly. The spring 157 provides a yield in the event that the lower mold continues to rise after the toggle has moved into straightened position.

In the operation of the machine, with the lower mold in its lowermost position to receive an outsole, the gage fingers will be held in open positions by the engagement of the plunger 97 with the notch 95 in the drum 77. With the gage pin 111 adjusted for the proper size of sole, an outsole is placed on the lower mold and the machine tripped by movement of the member 109 (Fig. 4) in a clockwise direction. During this movement of the member 109, which through suitable mechanism (not shown) initiates upward movement of the lower mold 1, the plunger 97 is withdrawn whereupon the springs 57 (Figs. 2 and 3) are effective to move the gage fingers inwardly thereby properly to centralize the gages with respect to the molds. The lower mold now rises until the abutment 133 is engaged by one of the gage supporting arm pivot studs 25, 27 which occurs preferably at about the time when the sole is engaged by the lowest portion of the upper mold. The lower mold continues its upward movement, moving with respect to the gage fingers by reason of the contact of the supporting stud with the abutment 133, the gage fingers being held against further upward movement. During this time the fingers remain in engagement with the edge of the sole, the fingers being received in the clearance grooves 134 in the sides of the lower mold.

Finally the thrust rod 151 engages the arm 148 of the bell crank lever 147 to straighten the toggle just as the upward movement of the lower mold is nearing completion. An actual downward movement of the carriage now takes place due to the downward movement of the abutment 133, causing the arm 83 of the drum 77 to engage the yieldable abutment 85 and rotate the drum to open the side gages. By thus moving the carriage downwardly just prior to the opening movements of the gages, the possibility of interference between the gages as they swing outwardly, and the outer portions of the upper mold, is eliminated. The drum is finally latched in position to retain the gages in their open positions after which the lower mold returns to its original position, thus completing one cycle of operation of the machine.

Having thus described our invention what we claim as new and desire to secure by Letters Patent of the United States is:

1. In a sole molding machine, an upper sole molding form, a lower mold movable vertically toward and away from said upper form, a pair of gages associated with said lower mold engageable with opposite edges of a sole to locate the sole on the lower mold, means urging said gages toward each other, means mounting said gages for conjoint movement with the lower mold during the first part of the upward movement of the lower mold in the molding operation, means operative at a predetermined time in the upward movement of the lower mold for arresting upward movement of the gages therewith, and means operative at a predetermined time in the further upward movement of the lower mold for moving said gages downwardly.

2. In a sole molding machine, an upper sole molding form, a lower mold movable vertically toward and away from said upper form, a pair of gages associated with said lower mold engageable with opposite edges of a sole to locate the sole on the lower mold, means urging said gages toward each other, means mounting said gages for conjoint movement with the lower mold during the first part of the upward movement of the lower mold in the molding operation, means operative at a predetermined time in the upward movement of the lower mold for arresting upward movement of the gages therewith, means operative at a predetermined time in the further upward movement of the lower mold for moving said gages downwardly, and means operative in response to said downward movement of the gages for moving them outwardly of the lower mold.

3. In a sole molding machine, an upper sole molding form, a lower mold movable vertically toward and away from said upper form, apair of gages associated with said lower mold engageable with opposite edges of a sole to locate the sole on the lower mold, means urging said gages toward each other, means mounting said gages for conjoint movement with the lower mold during the first part of the upward movement of the lower mold in the molding operation, means operative at a predetermined time in the upward movement of the lower mold for arresting upward movement of the gages therewith, means operative at a predetermined time in the further upward movement of the lower mold for moving said gages downwardly, means operative in response to said downward movement of the gages for moving them outwardly of the lower mold, and means for latching the gages in separated positions.

4. In a sole molding machine, an upper sole molding form, a lower mold movable vertically toward and away from said upper form, a pair of gages associated with said lower mold engageable with opposite edges of a sole to locate the sole on the lower mold, means normally urging said gages toward each other, a carriage on which said gages are mounted, means mounting said carriage for vertical movement with said lower mold, said mounting means including a yieldable means permitting relative vertical movement between said lower mold and said carriage, means operative at a predetermined time in the upward movement of the lower mold for arresting the upward movement of the carriage, and means operative upon further upward movement of the lower mold for moving the carriage and the gages downwardly away from the upper molding form.

5. In a sole molding machine, an upper sole molding form, a lower mold movable vertically toward and away from said upper form, a pair of gages associated with said lower mold engageable with opposite edges of a sole to locate the sole on the lower mold, means normally urging said gages toward each other, a carriage on which said gages are mounted, means mounting said carriage for vertical movement with said lower mold, said mounting means including a yieldable means permitting relative vertical movement between said lower mold and said carriage, means operative at a predetermined time in the upward movement of the lower mold for arresting the upward movement of the carriage, means operative upon further upward movement of the lower mold for moving the carriage and the gages downwardly away from the upper molding form, and means operative in response to said downward movement of the carriage for moving the gages outwardly of the lower mold.

6. In a sole molding machine, an upper sole molding form, a lower mold movable vertically toward and away from said upper form, a pair of gages associated with said lower mold engageable with opposite edges of a sole to locate the sole on the lower mold, means normally urging said gages toward each other, a carriage on which said gages are mounted, means mounting said carriage for vertical movement with said lower mold, said mounting means including a yieldable means permitting relative vertical movement between said lower mold and said carriage, means operative at a predetermined time in the upward movement of the lower mold for arresting the upward movement of the carriage, means operative upon further upward movement of the lower mold for moving the carriage and the gages downwardly away from the upper molding form, means operative in response to said downward movement of the carriage for moving the gages outwardly of the lower mold, and means on the carriage for latching the gages in their separated positions.

No references cited.